United States Patent
Zhang et al.

(10) Patent No.: US 9,137,756 B2
(45) Date of Patent: Sep. 15, 2015

(54) METHOD FOR SENDING/ACQUIRING A SIR TARGET VALUE AND A SERVING RADIO NETWORK CONTROL

(75) Inventors: Yu Zhang, Shenzhen (CN); Xiang Cheng, Shenzhen (CN); Meifang He, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 156 days.

(21) Appl. No.: 13/259,525

(22) PCT Filed: Feb. 9, 2010

(86) PCT No.: PCT/CN2010/070592
§ 371 (c)(1),
(2), (4) Date: Dec. 13, 2011

(87) PCT Pub. No.: WO2011/022959
PCT Pub. Date: Mar. 3, 2011

(65) Prior Publication Data
US 2013/0034033 A1  Feb. 7, 2013

(30) Foreign Application Priority Data
Aug. 24, 2009  (CN) .......................... 2009 1 0170472

(51) Int. Cl.
*H04W 4/00* (2009.01)
*H04W 52/12* (2009.01)
(Continued)

(52) U.S. Cl.
CPC ............ *H04W 52/12* (2013.01); *H04W 52/241* (2013.01); *H04W 52/386* (2013.01); *H04W 52/146* (2013.01); *H04W 52/286* (2013.01); *H04W 72/0433* (2013.01)

(58) Field of Classification Search
USPC .......................... 370/252, 328, 329, 338, 401
See application file for complete search history.

(56) References Cited
U.S. PATENT DOCUMENTS 6,535,739 B1* 3/2003 Chen et al. ................. 455/437
7,436,770 B2  10/2008 Sterne et al.
(Continued)

FOREIGN PATENT DOCUMENTS
CN     1801689 A    7/2006
CN  101868010 A   10/2010
(Continued)

OTHER PUBLICATIONS
International Search Report, mailed Jan. 27, 2011, in counterpart International Patent Application No. PCT/CN2010/070592, 4 pgs.
(Continued)

*Primary Examiner* — Ricky Ngo
*Assistant Examiner* — Christine Ng
(74) *Attorney, Agent, or Firm* — Brian J. Colandreo; Michael T. Abramson; Holland & Knight LLP

(57) ABSTRACT

The present invention discloses a method for sending/acquiring a SIR target value and a Serving Radio Network Control. The above sending method comprises: a Serving Radio Network Control (SRNC) sending an outer loop power control frame to a Node B, wherein the outer loop power control frame carries carrier identification information and a SIR Target value of a carrier corresponding to the carrier identification information. The above acquiring method comprises: a Node B receiving an outer loop power control frame sent by a Serving Radio Network Control (SRNC) and acquiring carrier identification information and a SIR Target value of a carrier corresponding to the carrier identification information from the outer loop power control frame; and the Node B updating a SIR Target value of the carrier corresponding to the carrier identification information to be the SIR Target value. By means of the present invention, uplink N carrier HSUPA functions can be ensured to be performed correctly and reasonably, and the Node B is enabled to perform power control to independent uplink transmission in an N carrier system.

7 Claims, 7 Drawing Sheets

(51) Int. Cl.
*H04W 52/38* (2009.01)
*H04W 52/24* (2009.01)
*H04W 72/04* (2009.01)
*H04W 52/14* (2009.01)
*H04W 52/28* (2009.01)

(56) References Cited

U.S. PATENT DOCUMENTS

| | | | |
|---|---|---|---|
| 8,396,503 B2* | 3/2013 | Larsson et al. | 455/522 |
| 8,400,935 B2* | 3/2013 | Pelletier et al. | 455/522 |
| 2006/0079264 A1* | 4/2006 | Gu et al. | 455/522 |
| 2006/0270435 A1* | 11/2006 | Chemiakina et al. | 455/522 |
| 2006/0293075 A1* | 12/2006 | Kansakoski et al. | 455/522 |
| 2007/0197252 A1* | 8/2007 | Watanabe et al. | 455/522 |
| 2008/0049698 A1* | 2/2008 | Kim | 370/342 |
| 2008/0108311 A1* | 5/2008 | Shindo | 455/73 |
| 2009/0103507 A1* | 4/2009 | Gu et al. | 370/342 |
| 2010/0110988 A1* | 5/2010 | Marinier et al. | 370/328 |
| 2010/0273520 A1* | 10/2010 | Pelletier et al. | 455/522 |
| 2010/0323744 A1* | 12/2010 | Kim et al. | 455/522 |
| 2012/0002610 A1* | 1/2012 | Widegren et al. | 370/328 |

FOREIGN PATENT DOCUMENTS

| | | |
|---|---|---|
| WO | 2006059172 A1 | 6/2006 |
| WO | 2010/107377 A1 | 9/2010 |

OTHER PUBLICATIONS

English translation of International Search Report, mailed Jan. 27, 2011, in counterpart International Patent Application No. PCT/CN2010/070592, 4 pgs.
English translation of abstract of CN 18016789, 1 pg.
English translation of abstract of CN 101868010, 1 pg.
3rd Generation Partnership Project (3GPP), TS 25.427 V8.1.0 [online], Technical Specification Group Radio Access Network; UTRAN Iub/Iur interface user plane protocol for DCH data streams (Release 8), Dec. 31, 2008, pp. 13-14, Section 5.4; pp. 34-35, Section 6.3.3.4, figures 5,7; retrieved from internet, 47 pgs.
3rd Generation Partnership Project (3GPP), TS 25.427 V9.0.0 [online], Technical Specification Group Radio Access Network; UTRAN Iub/Iur interface user plane protocol for DCH data streams (Release 9), Dec. 31, 2009, Sections 5.4.6.3.3.4.6.2.4.21; retrieved from internet, 48 pgs.
3rd Generation Partnership Project (3GPP), TGS-RAN3 Meeting #66 R3-093206, Introduction of Dual-Cell HSUPA [online], Nov. 13, 2009, Nokis Siemend Networks, Nokia, Ericsso, ZTE , Sections 6.2.4.xx.6.3.3.4; retrieved from internet, 11 pgs.
Extended European Search Report for European Application No. 10 81 1125 dated Sep. 10, 2013.
Huawei, Considerations on DC-HSUPA Operation. 3GPP TSG RAN WG1 Meeting #56. Athens, Greece, Feb. 9-13, 2009. vol. R1-090886, No. 56. 3 pages.

\* cited by examiner

METHOD FOR SENDING/ACQUIRING A SIR TARGET VALUE AND A SERVING RADIO NETWORK CONTROL

RELATED APPLICATIONS

The subject application is a U.S. National Stage application of International Application No. PCT/CN2010/070592, filed on 09 Feb. 2010, which claims the priority of Chinese Patent Application No.: 200910170472.0, filed on 24 Aug. 2009, the contents of which are herein incorporated by reference in its entirety.

FIELD OF THE INVENTION

The present invention relates to communication field, and in particular to a method for sending/acquiring a SIR target value, a Serving Radio Network Control and a Node B.

BACKGROUND OF THE INVENTION

Frame structures of a frame protocol layer of an Iub/Iur Frame Protocol (FP) can be divided into a data frame and a control frame according to uses. The control frame is used to transmit control information between a Serving Radio Network Control (SRNC) and a Node B, wherein the control frame used to carry uplink outer loop power control information is called as an outer loop power control frame.

FIG. 1 shows the transmitting process of the outer loop power control frame, which is transmitted from the SRNC to the Node B via an Iub/Iur interface by the frame protocol layer. The SRNC measures the transmission quality of data transmitted from the Node B, and dynamically adjusts a SIR Target value according to the transmission quality, which is indicated in the SIR TARGET domain of the outer loop power control frame; and the SIR Target value is used for the process of an uplink inner loop power control. The Node B measures an actual uplink SIR value received, compares it with the SIR Target value sent to the Node B by the SRNC, and adjusts the uplink transmission power of a current user equipment (UE) according to the result of the comparison. Specifically, if the measured SIR value is less than a target SIR value, the Node B will notify the UE to increase the transmission power; and if the measured SIR value is more than the target SIR value, the Node B will notify the UE to reduce the transmission power. By means of this process, the SRNC is enabled to control the uplink transmission power of the UE; and the communication quality of each link can basically remain at a set value.

FIG. 2 shows the frame structure of the above outer loop power control frame which carries the uplink outer loop power control information and is transmitted between the SRNC and the Node B. The outer loop power control frame comprises the following two parts:

(1) a head comprising the following three domains:

a CRC checking code domain, which has a length of 7 bits, is located from bit 7 to bit 1 of the first byte of the head of the frame, and is used to represent checking code(s) generated from the part of the frame excluding the CRC checking code domain according to a checking code generating formula;

a frame type indication domain, which has a length of 1 bit, is located at bit 0 of the first byte of the head of the frame, and is used to indicate whether the frame is the data frame or the control frame; and since the outer loop power control frame belongs to the control frame, the corresponding bit of the domain is "1"; and a control frame type domain, which has a length of 8 bits, is located in the second byte of the frame head, and is used to represent the type of the control information;

(2) a payload comprising the following 2 domains:

a SIR TARGET domain, which has a length of 1 byte, is located in the first byte of a payload part, and used to indicate the SIR Target value of the uplink inner loop power control; wherein the SIR Target value is determined by the SRNC according to the result of comparing the current data transmission quality with the SIR Target value, the range of the SIR Target value that can be represented is {−8.2 dB, . . . , 17.3 dB}, and the corresponding relations between mapped values of the domain and SIR Target values are illustrated in Table 1 as follows:

TABLE 1

| UL_SIR_TARGET | SIR Target |
| --- | --- |
| 000 | −8.2 dB |
| 001 | −8.1 dB |
| 002 | −8.0 dB |
| . . . | . . . |
| 254 | 17.2 dB |
| 255 | 17.3 dB | and a rest extending domain, which has a length from 0 to 32 bytes and is used for extending new information elements (IE).

With the introduction of a High Speed Uplink Packet Access (HSUPA) technology, a terminal will be enabled to transmit data on N (N is more than or equal to 1) carriers at the same time. The uplink transmission power of the UE is the sum of the uplink transmission power of all the carriers, and each of the carriers will independently perform an uplink transmission power control, i.e., the Node B needs to independently adjust the transmission power of each of the uplink carriers of the UE, therefore, the Node B needs to acquire the SIR Target values corresponding to each of the carriers, i.e., in an uplink N (N is more than or equal to 1) carrier system, relationships between the carriers and the SIR Target values need to be included in the uplink outer loop power control information.

If the outer loop power control frame structure in the prior art is used to carry the uplink outer loop power control information, after dynamically adjusting the SIR Target values of each of the carriers, the SRNC can only carry the SIR Target value by the SIR TARGET domain of the outer loop power control frame, and can not carry information associated with the carriers or information of relationships between the SIR Target values and the carriers. Therefore, the Node B can neither judge that an inner loop power control of which carrier is performed by means of the SIR Target value indicated by the SIR TARGET domain in the current outer loop power control frame nor judge the uplink transmission power of which carrier is to be adjusted according to the uplink outer loop power control information carried in the outer loop power control frame structure. As a result, relationships between the carriers and the SIR Target values can not be acquired; and the inner loop power control can not be performed on a certain carrier either.

Effective solutions have not been proposed for the problems in the related art that in an N carrier HSUPA system, the relationships between the carriers and the SIR Target values can not be acquired and an independent uplink transmission power control can not be performed to the carriers.

SUMMARY OF THE INVENTION

The present invention is proposed for the problems in the related art that in an N carrier HSUPA system, relationships between carriers and SIR Target values can not be acquired and an independent uplink transmission power control can not be performed on the carriers. Therefore, the main object of the present invention is to provide a method and an apparatus for acquiring SIR Target values to solve at least one of the above problems.

To achieve the above object, according to one aspect of the present invention, a method for sending a SIR Target value is provided.

The method for sending a SIR Target value according to the present invention comprises: a Serving Radio Network Control (SRNC) sending an outer loop power control frame to a Node B, wherein the outer loop power control frame carries carrier identification information and a SIR Target value of a carrier corresponding to the carrier identification information.

Preferably, after the SRNC sending the outer loop power control frame to the Node B, the above method also comprises: the Node B receiving the outer loop power control frame from the SRNC, and acquiring the carrier identification information and the SIR Target value from the outer loop power control frame; and the Node B updating a SIR Target value of the carrier corresponding to the carrier identification information to be the acquired SIR Target value.

Preferably, before the SRNC sending the outer loop power control frame to the Node B, the above method also comprises: the SRNC adjusting the SIR Target value of the carrier corresponding to the carrier identification information according to current data transmission quality.

Preferably, a carrier identification domain is set in a payload part of the outer loop power control frame, wherein the carrier identification information is carried in the carrier identification domain.

Preferably, the carrier identification information comprises a carrier number, and the carrier number is set in the carrier identification domain.

Preferably, the carrier identification information comprises a carrier number and a single/multi carrier system indicator; a single/multi carrier system indication sub-domain and a multi-carrier system carrier identification sub-domain are set in the carrier identification domain of the outer loop power control frame; the single/multi carrier system indication sub-domain is used for the single/multi carrier system indicator to be placed in, wherein the single/multi carrier system indicator is used to indicate whether the system is a single carrier system or a multi-carrier system; and the multi-carrier system carrier identification sub-domain is used for the carrier number to be placed in under a situation that the single/multi carrier system indicator in the single/multi carrier system indication sub-domain indicates a multi-carrier system.

To achieve the above object, according to another aspect of the present invention, a method for acquiring a SIR Target value is provided.

The method for acquiring a SIR Target value according to the present invention comprises: a Node B receiving an outer loop power control frame sent by a Serving Radio Network Control (SRNC) and acquiring carrier identification information and a SIR Target value of a carrier corresponding to the carrier identification information from the outer loop power control frame; and the Node B updating a SIR Target value of the carrier corresponding to the carrier identification information to be the SIR Target value.

To achieve the above object, according to yet another aspect of the present invention, a Serving Radio Network Control (SRNC) is provided.

The Serving Radio Network Control (SRNC) according to the present invention comprises: a setting module, configured to set carrier identification information and a SIR Target value of a carrier corresponding to the carrier identification information in an outer loop power control frame; and a sending module, configured to send the outer loop power control frame set by the setting module to a Node B.

Preferably, the above SRNC also comprises: an adjusting module, configured to adjust the SIR Target value of the carrier corresponding to the carrier identification information according to current data transmission quality.

To achieve the above object, according to yet another aspect of the present invention, a Node B is provided.

The Node B according to the present invention comprises: a receiving module, configured to receive an outer loop power control frame sent by a Serving Radio Network Control (SRNC); an acquiring module, configured to acquire carrier identification information and a SIR Target value of a carrier corresponding to the carrier identification information from the outer loop power control frame received by the receiving module; and an updating module, configured to update a SIR Target value of the carrier corresponding to the carrier identification information acquired by the acquiring module to be the SIR Target value acquired by the acquiring module.

By means of the present invention, in which the carrier identification information and its corresponding SIR Target value are carried in the outer loop power control frame, the problems can be solved that in the N carrier HSUPA system, relationships between the carriers and the SIR Target values can not be acquired and the uplink transmit power control can not be performed to the carriers independently, and uplink N carrier HSUPA functions can be ensured to be performed correctly and reasonably. Therefore, the Node B is enabled to achieve power control of independent uplink transmit in an N carrier system.

BRIEF DESCRIPTION OF THE DRAWINGS

Drawings, provided for further understanding of the present invention and forming a part of the specification, are used to explain the present invention together with embodiments of the present invention rather than to limit the present invention, wherein.

DETAILED DESCRIPTION OF THE EMBODIMENTS

Figure 1:
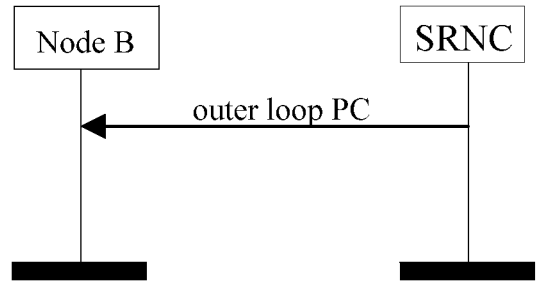
FIG. 1 is a diagram schematically showing the transmitting process of an outer loop power control frame according to the related art.
Figure 2:
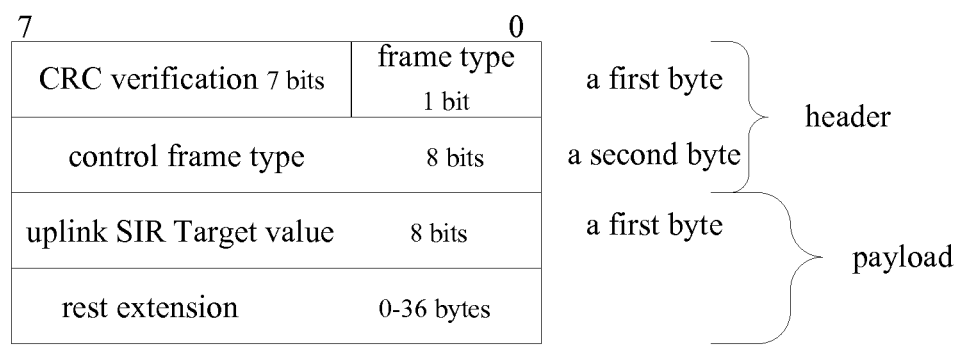
FIG. 2 is a diagram schematically showing the structure of the outer loop power control frame according to the related art.

Considering the problem existing in the prior art that an independent uplink transmission power control can not be performed on carriers in an N carrier HSUPA system, one embodiment of the present invention provides a solution for processing a SIR Target value; wherein a Serving Radio Network Control (SRNC) sends an outer loop power control frame to a Node B, wherein carrier identification information and a SIR Target value corresponding to the carrier identification information are carried in the outer loop power control frame. This solution can solve technical defects in existing systems, ensure uplink N carrier HSUPA functions to be performed correctly and reasonably, and achieve an object that the Node B independently performs the uplink transmission power control to a certain carrier in the N carrier system.

It should be noted that in the N carrier HSUPA system in the embodiments of the present invention, N is more than or equal to 1, i.e., the above N carrier system comprises a single carrier system and a multi-carrier system.

The present invention will be described in details in combination with the accompanying drawings and embodiments hereinafter. It should be noted that if there is no conflict, the embodiments of the present application and the technical features thereof can be combined with each other.

Method Embodiments

According to the embodiments of the present invention, a method for sending a SIR Target value is provided. The method comprises: a Serving Radio Network Control (SRNC) sending an outer loop power control frame to a Node B, wherein the outer loop power control frame carries carrier identification information and a SIR Target value of a carrier corresponding to the carrier identification information. That is, the SRNC makes the SIR Target value of a certain carrier and the carrier identifier of the carrier to be included in the outer loop power control frame transmitted to the Node B.

After the SRNC sends the outer loop power control frame to the Node B, the Node B receives the outer loop power control frame from the SRNC and acquires the carrier identification information and the SIR Target value from the outer loop power control frame; and the Node B updates the SIR Target value of the carrier corresponding to the carrier identification information to be the acquired SIR Target value. That is, the Node B receives the outer loop power control frame from the SRNC side, acquires the SIR Target value and the carrier identifier of carrier n from the outer loop power control frame, and updates the SIR Target value of carrier n to be the SIR Target value acquired from the outer loop power control frame.

After the Node B updates the SIR Target value of the carrier corresponding to the carrier identification information to be the acquired SIR Target value, the method may also comprise that: the Node B measures an actual uplink SIR value of the carrier corresponding to the carrier identification information, compares it with the SIR Target value of that carrier, and adjusts an uplink transmission power of the carrier according to the result of the comparison.

Before sending the outer loop power control frame to the Node B, the SRNC may adjust the SIR Target value of the carrier corresponding to the carrier identification information according to a current data transmission quality. That is, the SRNC corrects the SIR Target value corresponding to carrier n.

In the above, a carrier identification domain is set in the payload part of the outer loop power control frame, wherein the carrier identification information is carried in the carrier identification domain. The carried carrier identification information can have the following two forms: carrier identification information including a carrier number; and carrier identification information including the carrier number and a single/multi carrier system indicator, wherein the single/multi carrier system indicator is used to indicate that whether the system is a single carrier system or a multi-carrier system. The present invention will be described in details as follows.

The structure of the outer loop power control frame applied in the embodiments of the present invention will be introduced first. The outer loop power control frame is used to carry, in an N carrier HSUPA system, uplink outer loop power control information which includes the SIR Target value corresponding to the carrier and the carrier identifier.

The structure of the payload part of the outer loop power control frame comprises three domains as follows.

A SIR TARGET domain, with a length of one byte and located at the first byte of the payload part, indicates the SIR Target value corresponding to the carrier indicated by the carrier identification domain. The relationships between mapped values of the domain and SIR Target values are shown in Table 1 and are consistent with the length of the SIR Target value domain and relationships between mapped values of the domain and the SIR Target values in the prior art.

A carrier identification domain, located behind the SIR TARGET domain of the payload part, is used to identify carriers and represents that the SIR Target value indicated by the SIR TARGET domain is the SIR Target value corresponding to the carrier indicated by the carrier identification domain. Additionally, the carrier identification domain is used to identify carrier n in an uplink N carrier HSUPA system. There are two methods for carrier identification respectively corresponding to the above two forms of the carrier identification information. The two identification methods will be described in details hereinafter.

Method 1, a Direct Identification Method

In this method, corresponding carrier identification information includes the carrier number, and this carrier number is configured in the carrier identification domain, which will be illustrated in details as follows.

1) The carrier identification domain occupies at least one bit.

2) The value of that domain is the carrier number of the carriers, which can represent carrier 1 (including situations of a single carrier or the first carrier of multi carriers), carrier 2, . . . , carrier n, . . . , and carrier N.

Method 2, an Indirect Identification Method

In this method, the corresponding carrier identification information comprises the carrier number, and the single/multi carrier system indicator; a single/multi carrier system indication sub-domain and a multi-carrier system carrier identification sub-domain are set in the carrier identification domain of the outer loop power control frame; and the single/multi carrier system indication sub-domain is used for the single/multi carrier system indicator to be placed in, wherein the single/multi carrier system indicator is used to indicate whether the system is a single carrier system or a multi-carrier system; and the multi-carrier system carrier identification sub-domain is used for the carrier number to be placed in under the situation that the single/multi carrier system indicator in the single/multi carrier system indication sub-domain indicates the multi-carrier system. It will be described in details as follows.

1) The carrier identification domain is divided into two sub-domains: the single/multi carrier system indication sub-domain and the multi-carrier system carrier identification sub-domain.

2) The single/multi carrier system indication sub-domain occupies one bit and is used to identify whether the system is the single carrier system or the multi-carrier system.

3) The multi-carrier system carrier identification sub-domain is only valid in the multi-carrier system, occupies at least one bit, and identifies the carrier number of carrier n in the multi-carrier system, i.e., when the carrier identification domain is used to identify carrier n of the N carrier system, this sub-domain identifies the carrier number of carrier n.

A rest extending domain with a length from 0 to 32 bytes is applicable for extending new IEs.

The payload part of the outer loop power control frame carries the carrier identifier and the SIR Target value corresponding to the carrier indicated by the carrier identifier, so that the SRNC can transmit the SIR Target value corresponding to the carrier and the carrier identifier via the outer loop power control frame of the frame protocol layer of an Iub/Iur interface, and the Node B can acquire the SIR Target value based on the carrier by this outer loop power control frame and adjust the uplink transmit power of a corresponding carrier in an inner loop power control process.

Figure 3:
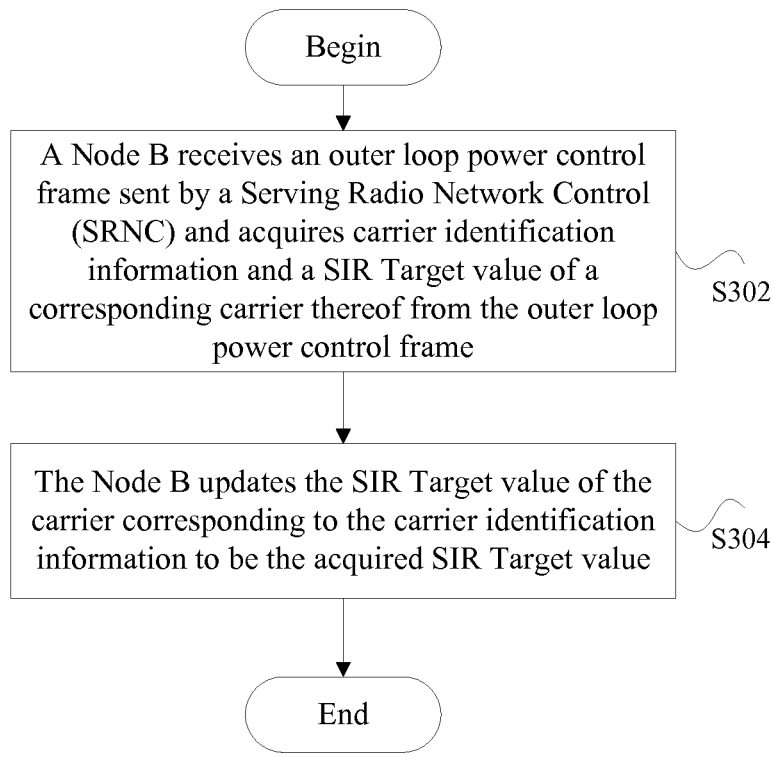
FIG. 3 is a flow chart of a method for acquiring a SIR Target value according to an embodiment of the present invention.

FIG. 3 shows the flow of a method for acquiring a SIR Target value according to an embodiment of the present invention; and this method comprises processes from Steps S302 to S304 as follows.

Step S302, a Node B receives an outer loop power control frame sent by a Serving Radio Network Control (SRNC) and acquires carrier identification information and a SIR Target value of a corresponding carrier thereof from the outer loop power control frame.

Step S304, the Node B updates the SIR Target value of the carrier corresponding to the carrier identification information to be the acquired SIR Target value.

After Step S304, the method can also comprise that the Node B measures an actual uplink SIR value of the carrier corresponding to the carrier identification information, compares it with the SIR Target value of that carrier and adjusts the uplink transmission power of that carrier according to the result of the comparison.

The implementing process of the embodiments of the present invention will be described in details in combination with examples.

EXAMPLE 1

Figure 4:
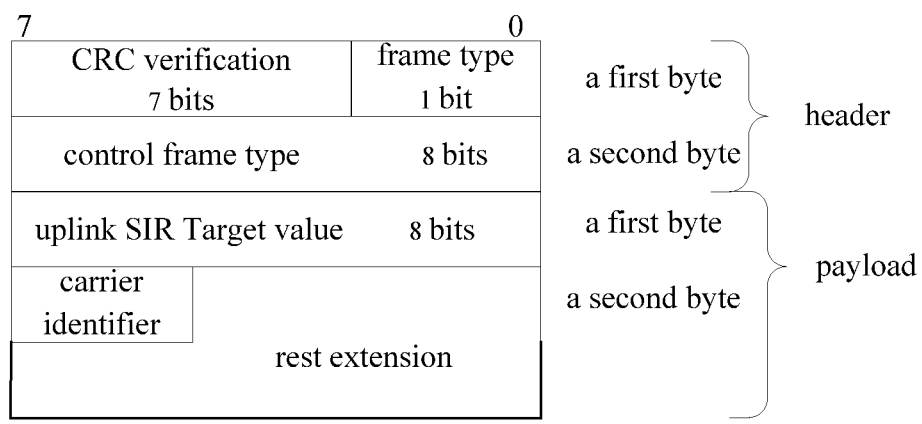
FIG. 4 is a diagram schematically showing the structure of another outer loop power control frame applied in Example 1 of the present invention.

In this example, it is assumed that the terminal uses a dual carrier uplink access system technology; the first carrier of the dual carriers is recorded as carrier 1, while the second carrier of the dual carriers is recorded as carrier 2; and the SIR Target value needs to be adjusted in carrier 1. The frame structure applied in this example is shown in FIG. 4. The first byte of the payload part of an outer loop power control frame is set as a SIR TARGET domain for carrying the SIR Target value; the relationship between the mapped value of that domain and the SIR Target value is shown in Table 1; and a carrier identification domain, whose length is determined according to the number of carriers supported by the system and which is used to carry carrier identification information corresponding to the SIR Target value, is set behind the SIR TARGET domain in the payload part. In this example, the length of the carrier identification domain is 1 bit, the carried carrier identification information is a carrier number; and the relationships between the mapped values of the carrier identification domain and the carriers are shown Table 2.

TABLE 2

| mapped values of the carrier identification domain | Corresponding carriers |
|---|---|
| 0 | Carrier 1 |
| 1 | Carrier 2 |

It should be understood that limitation to the frame structure, the carrier number, and the relationships between the mapped values of the carrier identification domain and the carriers are only used to illustrate the present invention better without unduly limiting the present invention.

Figure 5:
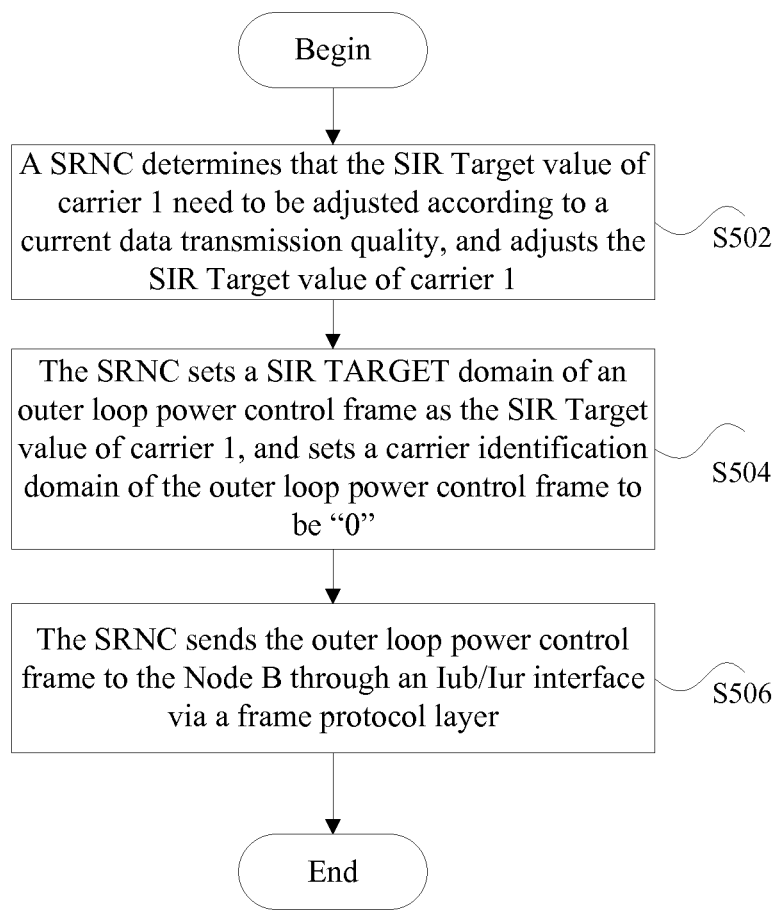
FIG. 5 is a flow chart of a method for sending a SIR Target value by a SRNC according to Example 1 of the present invention.

FIG. 5 shows the flow of a method for sending a SIR Target value by a SRNC according to Example 1 of the present invention, and the method specifically comprises the following steps.

Step S502, a SRNC determines that the SIR Target value of carrier 1 need to be adjusted according to current data transmission quality, and adjusts the SIR Target value of carrier 1.

Step S504, the SRNC sets a SIR TARGET domain of an outer loop power control frame as the SIR Target value of carrier 1, and sets a carrier identification domain of the outer loop power control frame to indicate that what SIR TARGET domain indicates is the SIR Target value corresponding to carrier 1, i.e., the value of the carrier identification domain is set to be "0".

Step S506, the SRNC sends the outer loop power control frame to the Node B through an Iub/Iur interface via a frame protocol layer.

Figure 6:
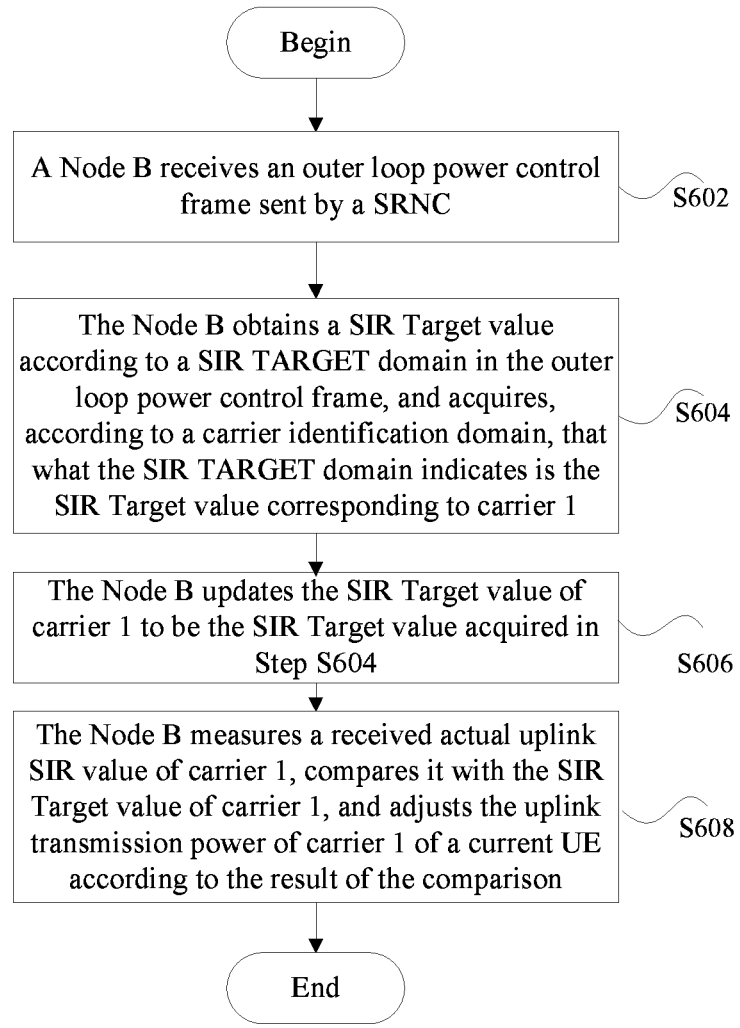
FIG. 6 is a flow chart of a method for acquiring a SIR Target value by a Node B according to Example 1 of the present invention.

FIG. 6 shows the flow of a method for acquiring a SIR Target value by the Node B according to Example 1 of the present invention, and the method specifically comprises the following steps.

Step S602, a Node B receives an outer loop power control frame sent by a SRNC.

Step S604, the Node B obtains a SIR Target value according to a SIR TARGET domain in the outer loop power control frame, and acquires, according to a carrier identification domain, what the SIR TARGET domain indicates is the SIR Target value corresponding to carrier 1.

Step S606, the Node B updates the SIR Target value of carrier 1 to be the SIR Target value acquired in Step S604.

Step S608, the Node B measures a received actual uplink SIR value of carrier 1, compares it with the SIR Target value of carrier 1, and adjusts the uplink transmission power of carrier 1 of a current UE according to the result of the comparison.

It can be concluded from the above description that in the embodiments of the present invention, the Node B can perform an independent uplink transmit power control on an N carrier system.

EXAMPLE 2

Figure 7:
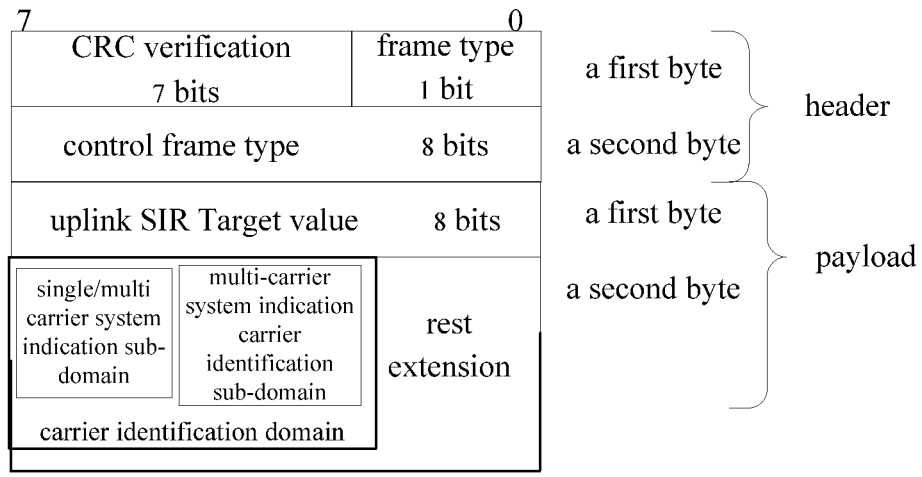
FIG. 7 is a diagram schematically showing the structure of another outer loop power control frame applied in Example 2 of the present invention.

In this example, it is assumed that the terminal uses a four carrier uplink access system technology, the first carrier of the four carriers is recorded as carrier 1, the second carrier is recorded as carrier 2, the third carrier is recorded as carrier 3, and the fourth carrier is recorded as carrier 4. Moreover, a SIR Target value needs to be adjusted in carrier 3. The frame structure applied in this example is shown in FIG. 7. The first byte of the payload part of an outer loop power control frame is set as a SIR TARGET domain which is used to carry a SIR Target value, the relationship between the mapped value of that domain and the SIR Target value is shown in Table 1. A carrier identification domain, for carrying carrier identification information corresponding to the SIR Target value, is set behind the SIR TARGET domain in the payload part. The carrier identification domain is divided into two sub-domains: a single/multi carrier system indication sub-domain and a multi-carrier system carrier identification sub-domain, wherein the length of the single/multi carrier system indication sub-domain is 1 bit, the carried carrier identification information is a single/multi carrier system indicator, which is use to indicate whether the system is a single carrier system or a multi-carrier system. In this example, it is assumed that it the value of single/multi carrier system indicator is "0", the system is the single carrier system; and if the value of single/multi carrier system indicator is "1", the system is the multi-carrier system. The multi-carrier system carrier identification sub-domain, whose length is determined according to the number of carriers supported by the system, is located behind the single/multi carrier system indication sub-domain, and is valid when the single/multi carrier system indication sub-domain indicates the multi-carrier system. In this example, its length is 2 bits and the carried carrier identification information is a carrier number; and relationships between mapped values of the carrier identification domain and the carriers are shown in Table 3.

TABLE 3

| Mapped values of the carrier identification domain | Corresponding carriers |
| --- | --- |
| 100 | Carrier 1 |
| 101 | Carrier 2 |
| 110 | Carrier 3 |
| 111 | Carrier 4 |

It is to be understood that limitations to the frame structure, the carrier number, the single/multi carrier system indicator and the relationships between the mapped values of the carrier identification domain and the carrier only used to illustrate the present invention better without unduly limiting the present invention.

Figure 8:
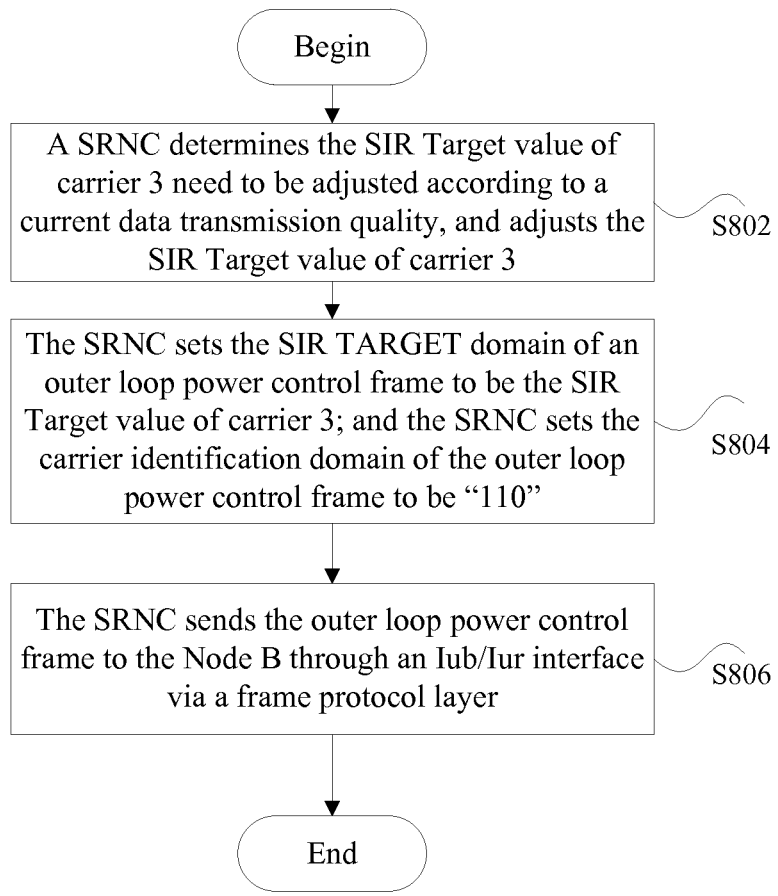
FIG. 8 is a flow chart of a method for sending a SIR Target value by the SRNC according to Example 2 of the present invention.

FIG. 8 shows the flow of a method for sending a SIR Target value by a SRNC according to Example 2 of the present invention, and the method specifically comprises the following steps.

Step S802, a SRNC determines the SIR Target value of carrier 3 needed to be adjusted according to current data transmission quality, and adjusts the SIR Target value of carrier 3.

Step S804, the SRNC sets the SIR TARGET domain of an outer loop power control frame to be the SIR Target value of carrier 3; and the SRNC sets the carrier identification domain of the outer loop power control frame to indicate what the SIR TARGET domain indicates is the SIR Target value corresponding to carrier 3, i.e., the value of the carrier identification domain is set to be "110". More specifically, the value of a single/multi carrier system indication sub-domain is "1", and the value of a multi-carrier system carrier identification sub-domain is "10".

Step S806, the SRNC sends the outer loop power control frame to the Node B through an Iub/Iur interface via a frame protocol layer.

Figure 9:
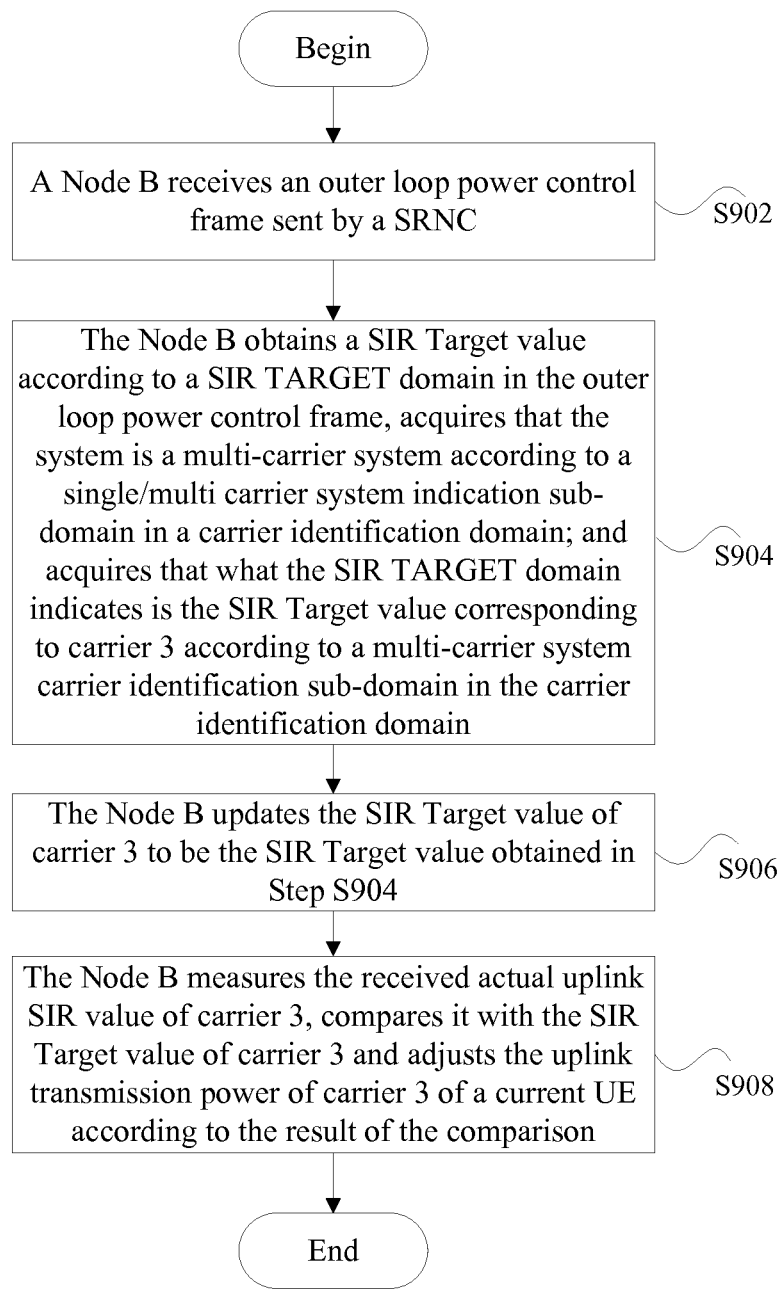
FIG. 9 is a flow chart of a method for acquiring a SIR Target value by the Node B according to Example 2 of the present invention.

FIG. 9 shows the flow of a method for acquiring a SIR Target value by a Node B according to Example 2 of the present invention, and the method specifically comprises the following steps.

Step S902, a Node B receives an outer loop power control frame sent by a SRNC.

Step S904, the Node B obtains a SIR Target value according to a SIR TARGET domain in the outer loop power control frame, acquires that the system is a multi-carrier system according to a single/multi carrier system indication sub-domain in a carrier identification domain; and acquires what the SIR TARGET domain indicates is the SIR Target value corresponding to carrier 3 according to a multi-carrier system carrier identification sub-domain in the carrier identification domain.

Step S906, the Node B updates the SIR Target value of carrier 3 to be the SIR Target value obtained in Step S904.

Step S908, the Node B measures the received actual uplink SIR value of carrier 3, compares it with the SIR Target value of carrier 3 and adjusts the uplink transmission power of carrier 3 of a current UE according to the result of the comparison.

It can be concluded from the above description that in the embodiments of the present invention, the Node B can perform an independent uplink transmit power control on an N carrier system.

Apparatus Embodiments

Figure 10:
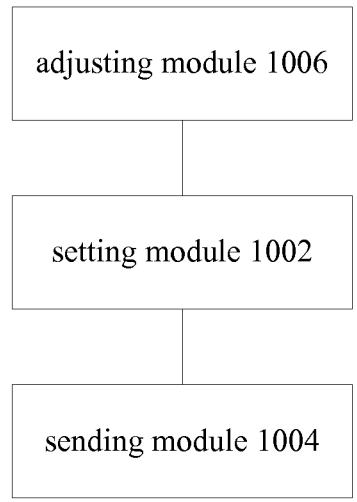
FIG. 10 is a diagram schematically showing the structure of the SRNC according to the embodiments of the present invention.

According to an embodiment of the present invention, a Serving Radio Network Control (SRNC) is provided. As shown in FIG. 10, the SRNC comprises:

a setting module 1002, configured to set carrier identification information and its corresponding SIR Target value in an outer loop power control frame;

a sending module 1004, connected with the setting module 1002, configured to send the outer loop power control frame set by the setting module to the Node B.

Preferably, the SRNC also comprises: an adjusting module 1006, connected with the setting module 1002, configured to adjust the SIR Target value of a carrier corresponding to the carrier identification information according to current data transmission quality.

Figure 11:
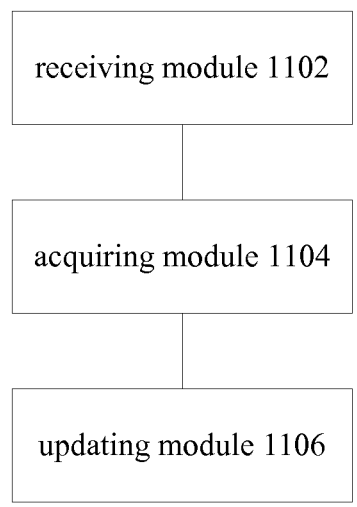
FIG. 11 is a diagram schematically showing the structure of the Node B according to the embodiments of the present invention.

According to an embodiment of the present invention, a Node B is also provided. As shown in FIG. 11, the Node B comprises:

a receiving module 1102, configured to receive an outer loop power control frame sent by a Serving Radio Network Control (SRNC);

an acquiring module 1104, connected with the receiving module 1102, configured to acquire carrier identification information and a SIR Target value of a corresponding carrier thereof from the outer loop power control frame received by the receiving module; and an updating module 1106, connected with the acquiring module 1104, configured to update the SIR Target value of the carrier corresponding to the carrier identification information acquired by the acquiring module to be the SIR Target value acquired by the acquiring module.

By means of the solutions provided by the embodiments of the present invention, in the situation that make a few change to the structure of the outer loop control frame in the prior art, the process of the prior art and an improved technology can be compatible, the relationships between the carrier and its SIR Target value can be indicated clearly, and the Node B is enabled to perform the power control of independent uplink transmit in the N carrier system.

Obviously, those skilled in the art shall understand that individual modules and individual steps of the present invention can be implemented with general computing devices, they may be integrated in a single computing device or distributed in network formed by a plurality of computing devices, optionally, they may be implemented by using program codes executable by computing devices, thus they may be stored in memory devices for execution by the computing devices, or implemented by making them into integrated circuit module respectively, or by making several means or steps in to a single IC. Thus, the present invention is not limited to any particular combination of hardware and software.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for sending a SIR Target value, comprising:
   a Serving Radio Network Control (SRNC) sending an outer loop power control frame to a Node B, wherein the outer loop power control frame carries carrier identification information and a SIR Target value of a carrier corresponding to the carrier identification information,
   wherein a carrier identification domain is set in a payload part of the outer loop power control frame, wherein the carrier identification information is carried in the carrier identification domain,
   wherein the carrier identification information comprises a carrier identifier and a single/multi carrier system indicator; a single/multi carrier system indication sub-domain and a multi-carrier system carrier identification sub-domain are set in the carrier identification domain of the outer loop power control frame; the single/multi carrier system indication sub-domain is used for the single/multi carrier system indicator to be placed in, wherein the single/multi carrier system indicator is used to indicate whether the system is a single carrier system or a multi-carrier system; and the multi-carrier system carrier identification sub-domain is used for the carrier identifier to be placed in under a situation that the single/multi carrier system indicator in the single/multi carrier system indication sub-domain indicates a multi-carrier system.

2. The method according to claim 1, wherein after the SRNC sending the outer loop power control frame to the Node B, the method further comprises:
   the Node B receiving the outer loop power control frame from the SRNC, and acquiring the carrier identification information and the SIR Target value from the outer loop power control frame; and
   the Node B updating a SIR Target value of the carrier corresponding to the carrier identification information to be the acquired SIR Target value.

3. The method according to claim 1, wherein before the SRNC sending the outer loop power control frame to the Node B, the method further comprises:
   the SRNC adjusting the SIR Target value of the carrier corresponding to the carrier identification information according to current data transmission quality.

4. A method for acquiring a SIR Target value, by comprising:
   a Node B receiving an outer loop power control frame sent by a Serving Radio Network Control (SRNC) and acquiring carrier identification information and a SIR Target value of a carrier corresponding to the carrier identification information from the outer loop power control frame; and
   the Node B updating a SIR Target value of the carrier corresponding to the carrier identification information to be the SIR Target value,
   wherein a carrier identification domain is set in a payload part of the outer loop power control frame, wherein the carrier identification information is carried in the carrier identification domain,
   wherein the carrier identification information comprises a carrier identifier and a single/multi carrier system indicator; a single/multi carrier system indication sub-domain and a multi-carrier system carrier identification sub-domain are set in the carrier identification domain of the outer loop power control frame; the single/multi carrier system indication sub-domain is used for the single/multi carrier system indicator to be placed in, wherein the single/multi carrier system indicator is used to indicate whether the system is a single carrier system or a multi-carrier system; and the multi-carrier system carrier identification sub-domain is used for the carrier identifier to be placed in under a situation that the single/multi carrier system indicator in the single/multi carrier system indication sub-domain indicates a multi-carrier system.

5. A Serving Radio Network Control (SRNC), by comprising:
   a computing device or a circuit, memory and one or more program units stored on the memory, wherein the program units are configured to be executed by the computing device or the circuit and comprises:
   a setting module, configured to set carrier identification information and a SIR Target value of a carrier corresponding to the carrier identification information in an outer loop power control frame; and
   a sending module, configured to send the outer loop power control frame set by the setting module to a Node B,
   wherein a carrier identification domain is set in a payload part of the outer loop power control frame, wherein the carrier identification information is carried in the carrier identification domain,
   wherein the carrier identification information comprises a carrier identifier and a single/multi carrier system indicator; a single/multi carrier system indication sub-domain and a multi-carrier system carrier identification sub-domain are set in the carrier identification domain of the outer loop power control frame; the single/multi carrier system indication sub-domain is used for the single/multi carrier system indicator to be placed in, wherein the single/multi carrier system indicator is used to indicate whether the system is a single carrier system or a multi-carrier system; and the multi-carrier system carrier identification sub-domain is used for the carrier identifier to be placed in under a situation that the single/multi carrier system indicator in the single/multi carrier system indication sub-domain indicates a multi-carrier system.

6. The SRNC according to claim 5, wherein the program units further comprise:
   an adjusting module, configured to adjust the SIR Target value of the carrier corresponding to the carrier identification information according to current data transmission quality.

7. A Node B, comprising:
   a computing device or a circuit, memory and one or more program units stored on the memory, wherein the program units are configured to be executed by the computing device or the circuit and comprises:
a receiving module, configured to receive an outer loop power control frame sent by a Serving Radio Network Control (SRNC);
an acquiring module, configured to acquire carrier identification information and a SIR Target value of a carrier corresponding to the carrier identification information from the outer loop power control frame received by the receiving module; and
an updating module, configured to update a SIR Target value of the carrier corresponding to the carrier identification information acquired by the acquiring module to be the SIR Target value acquired by the acquiring module,
wherein a carrier identification domain is set in a payload part of the outer loop power control frame, wherein the carrier identification information is carried in the carrier identification domain, wherein the carrier identification information comprises a carrier identifier and a single/multi carrier system indicator; a single/multi carrier system indication sub-domain and a multi-carrier system carrier identification sub-domain are set in the carrier identification domain of the outer loop power control frame; the single/multi carrier system indication sub-domain is used for the single/multi carrier system indicator to be placed in, wherein the single/multi carrier system indicator is used to indicate whether the system is a single carrier system or a multi-carrier system; and the multi-carrier system carrier identification sub-domain is used for the carrier identifier to be placed in under a situation that the single/multi carrier system indicator in the single/multi carrier system indication sub-domain indicates a multi-carrier system.

* * * * *